(12) United States Patent
Hong

(10) Patent No.: US 10,753,458 B2
(45) Date of Patent: Aug. 25, 2020

(54) TRANSMISSION CONTROL DEVICE DETECTING CHANGE OF SHIFT LEVEL AND VEHICLE HAVING THE SAME

(71) Applicant: KYUNG CHANG INDUSTRIAL CO., Ltd., Daegu (KR)

(72) Inventor: Hyeong Seok Hong, Daegu (KR)

(73) Assignee: KYUNG CHANG INDUSTRIAL CO., Ltd., Daegu (KR)

( * ) Notice: Subject to any disclaimer, the term of this patent is extended or adjusted under 35 U.S.C. 154(b) by 148 days.

(21) Appl. No.: 16/010,585

(22) Filed: Jun. 18, 2018

(65) Prior Publication Data
US 2018/0363766 A1 Dec. 20, 2018

(30) Foreign Application Priority Data
Jun. 20, 2017 (KR) .................. 10-2017-0078116

(51) Int. Cl.
| F16H 59/04 | (2006.01) |
| F16H 63/50 | (2006.01) |
| F16H 25/18 | (2006.01) |
| G01D 5/14 | (2006.01) |
| F16H 59/02 | (2006.01) |

(52) U.S. Cl.
CPC .......... *F16H 59/044* (2013.01); *F16H 25/18* (2013.01); *G01D 5/145* (2013.01); *F16H 63/50* (2013.01); *F16H 2059/0269* (2013.01)

(58) Field of Classification Search
CPC ...... F16H 59/044; F16H 63/50; F16H 59/105; G01D 5/145
See application file for complete search history.

(56) References Cited

U.S. PATENT DOCUMENTS

| 4,519,266 A * | 5/1985 | Reinecke | F16H 59/044 74/471 XY |
| 2004/0226801 A1* | 11/2004 | De Jonge | F16H 59/0204 192/220.7 |
| 2009/0062064 A1* | 3/2009 | Kamada | F16H 59/105 477/34 |

(Continued)

FOREIGN PATENT DOCUMENTS

| EP | 2 636 926 A1 * | 9/2013 |
| JP | 2007-085430 A | 4/2007 |

(Continued)

OTHER PUBLICATIONS

Define in—Google Search, google.com., Jan. 7, 2020 (Year: 2020).*

(Continued)

*Primary Examiner* — Vinh Luong
(74) *Attorney, Agent, or Firm* — Fenwick & West LLP

(57) ABSTRACT

A transmission control device may be provided that includes a magnet, a magnetic sensor, a slider, a shift lever, and a motion conversion member. The magnetic sensor is fixed to a predetermined position and measures a magnetic field which changes according to a relative position with respect to the magnet. The magnet is disposed at one end of the slider. The shift lever rotates to a position according to a shift level by user operations. When the shift lever rotates, the motion conversion member converts a rotational motion of the shift lever into a linear motion, and moves the slider in a first direction.

5 Claims, 5 Drawing Sheets

(56) References Cited

U.S. PATENT DOCUMENTS

| | | | | |
|---|---|---|---|---|
| 2010/0242656 A1* | 9/2010 | Kino | ................... | F16H 59/10 |
| | | | | 74/473.12 |
| 2016/0215875 A1* | 7/2016 | Grennvall | ............... | F16H 61/24 |
| 2016/0290495 A1* | 10/2016 | Bak | ..................... | G01D 5/142 |
| 2018/0238440 A1* | 8/2018 | Bruck | ................. | F16H 59/0204 |
| 2018/0363765 A1* | 12/2018 | Hong | ................... | G01D 5/145 |

FOREIGN PATENT DOCUMENTS

| | | |
|---|---|---|
| KR | 10-2014-0075175 A | 6/2014 |
| WO | WO 2009141807 A1 * | 11/2009 |

OTHER PUBLICATIONS

Chinese National Intellectual Property Administration, Office Action, Chinese Application No. 201810569637.0, dated Oct. 31, 2019, 8 pages (with concise explanation of relevance).

* cited by examiner

TRANSMISSION CONTROL DEVICE DETECTING CHANGE OF SHIFT LEVEL AND VEHICLE HAVING THE SAME This application claims priority under 35 U.S.C. § 119 or 365 to Korean Patent Application No. 10-2017-0078116 filed Jun. 20, 2017, the entire disclosure of which is hereby incorporated by reference.

BACKGROUND

Field

The present disclosure relates to a transmission control device, and more particularly to a transmission control device of a manual transmission, which detects the change of a shift level, and a vehicle including the same.

Description of the Related Art

A transmission converts the power generated by an engine into a rotational force. In an internal combustion engine, a Revolution Per Minute (RPM) band for obtaining the maximum torque is different from a Revolution Per Minute (RPM) band for obtaining the maximum output. Therefore, it is necessary to select an appropriate shift position in accordance with the speed of a vehicle or an engine RPM and to convert the power into the rotational force.

Here, a transmission control device controls the transmission. The transmission control device is divided into a manual shift control device (a manual transmission) and an automatic shift control device (an automatic transmission). The manual shift control device changes manually the shift position by user's operations. The automatic shift control device changes automatically the shift position.

Meanwhile, a state in which the engine of the vehicle is started but the vehicle is not traveling is referred to as an idling state. Since the engine is undoubtedly working even in the idling state, fuel is consumed, so that not only fuel efficiency is degraded, but also air pollution is caused. Therefore, for the purpose of solving such problems, research is being devoted to Idle Stop & Go (ISG) function that detects the idling state and turns off the engine. Further, a vehicle equipped with this function is being manufactured.

In the case of the manual shift control device, in an existing device that implements the (ISG) function, a sensor which detects the state where a vehicle is not traveling has a large and complex structure and is thus difficult to install in a narrow space.

For example, a prior art document, Korean Laid-open Patent Application No. 10-2014-0075175 (Jun. 19, 2014) describes the (ISG) function, but does not disclose in detail the sensor which detects the state where a vehicle is not traveling. Therefore, the prior art document still does not propose a transmission control device which can be installed in a narrow space.

SUMMARY

Technical Problem

An object of the present invention is to provide a transmission control device which detects the change of a shift level with a simple structure.

Another object of the present invention is to provide a vehicle that implements Idle Stop & Go (ISG) function.

However, the object of the present invention is not limited to the above description and can be variously extended without departing from the scope and spirit of the present invention.

Technical Solution

One embodiment is a transmission control device including: a magnet; a magnetic sensor which is fixed to a predetermined position and measures a magnetic field which changes according to a relative position with respect to the magnet; a slider one end of which has the magnet thereat; a shift lever which rotates to a position according to a shift level by user operations; and a motion conversion member which, when the shift lever rotates, converts the rotational motion of the shift lever into a linear motion, and moves the slider in a first direction.

The motion conversion member may convert the rotational motion into the linear motion on the basis of at least one of a cam mechanism, Scotch yoke mechanism, Whitworth Quick Return mechanism, or Slider Crank mechanism.

The motion conversion member may include: a cam which is disposed in the shift lever, contacts the other end of the slider, and moves the slider by a predetermined distance in the first direction when the shift lever rotates from a non-neutral position to a neutral position; and an elastic member which, when the shift lever rotates from the neutral position to the non-neutral position, moves the slider by the predetermined distance in a second direction opposite to the first direction.

The cam may be one of a heart cam, a groove cam, a conical cam, or a swash plate cam.

The shift lever may include a lever ball having a spherical shape centered on a rotation center of the shift lever. The cam may be disposed to protrude from the lever ball.

The transmission control device may further include a housing in which the magnetic sensor is disposed. One end of the elastic member is connected to the housing, and the other end is connected to the slider.

The magnetic sensor may be a Hall integrated circuit (IC).

Another embodiment is a vehicle including: an engine which generates power; a transmission which uses different gears according to a shift level and converts the power into a rotatory power; and a transmission control device which controls the shift level. The transmission control device includes: a magnet; a magnetic sensor which is fixed to a predetermined position and measures a magnetic field which changes according to a relative position with respect to the magnet; a slider one end of which has the magnet thereat; a shift lever which rotates to a position according to the shift level by user operations; and a motion conversion member which, when the shift lever rotates, converts the rotational motion of the shift lever into a linear motion, and moves the slider in a first direction.

The vehicle may further include an electronic control unit (ECU) which drives Idle Stop & Go (ISG) function on the basis of the measured magnet field at a neutral position where the power of the engine is not transmitted to wheels.

Advantageous Effects

A transmission control device according to the embodiments of the present invention has a structure in which the rotational motion of the shift lever is converted into the linear motion of the slider having magnet disposed therein.

Therefore, the magnet sensor is capable of relatively easily detecting the change of the shift level.

In a vehicle according to the embodiment of the present invention, the transmission control device detects the neutral position, so that it is possible to implement the Idle Stop & Go (ISG) function in the neutral position.

However, the effect of the present invention is not limited to the above description and can be various extended without departing from the scope and spirit of the present invention.

DETAILED DESCRIPTION

Hereinafter, preferred embodiments in accordance with the present invention will be described with reference to the accompanying drawings. The preferred embodiments are provided so that those skilled in the art can sufficiently understand the present invention, but can be modified in various forms and the scope of the present invention is not limited to the preferred embodiments.

Figure 1:
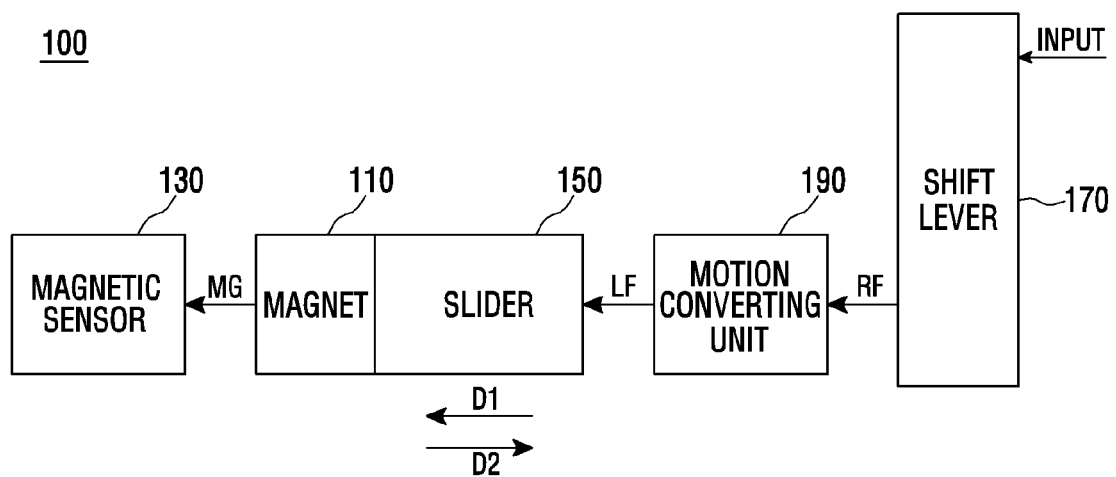
FIG. 1 is a block diagram showing a transmission control device according to embodiments of the present invention.

FIG. 1 is a block diagram showing a transmission control device according to embodiments of the present invention.

Referring to FIG. 1, a transmission control device 100 may include a magnet 110, a magnetic sensor 130, a slider 150, a shift lever 170, and a motion conversion member 190. According to the embodiment, the transmission control device 100 may further include a housing.

The magnet 110 can generate a magnetic field (MG). In the embodiment, the magnet 110 may be a permanent magnet. In another embodiment, the magnet 110 may be an electromagnet. In this case, the strength of the magnetic field (MG) generated by the magnet 110 can be controlled by the magnitude of the current which is supplied to the magnet 110.

The magnetic sensor 130 may be fixed to a predetermined position and measure the magnetic field (MG) which changes according to a relative position with respect to the magnet 110. Since the magnetic field that is generated around the magnet 110 is reduced with the increase of a distance from the magnet 110, a value of measured strength of the magnetic field may be substantially changed according to a position where the magnetic sensor 130 measures the magnetic field (MG) even though the magnet 110 generates substantially the same magnetic field (MG). For example, a first measured value measured by the magnetic sensor 130 which measures the strength of the magnetic field (MG) at a position apart from the magnet 110 by a first distance may be relatively greater than a second measured value measured by the magnetic sensor 130 which measures the strength of the magnetic field (MG) at a position apart from the magnet 110 by a second distance relatively greater than the first distance. Through this, the distance between the magnet 110 and the magnetic sensor 130 can be estimated on the basis of the strength of the magnetic field (MG) measured by the magnetic sensor 130.

According to the embodiment, the magnetic sensor 130 may be a Hall integrated circuit (Hall IC). Here, the Hall integrated circuit can measure the strength of the magnetic field (MG) on the basis of a Hall effect.

The magnet 110 may be disposed at one end of the slider 150. In one embodiment, the magnet 110 may be disposed on the surface of the one end of the slider 150. In another embodiment, the magnet 110 may be disposed in a space formed within the one end of the slider 150.

The slider 150 can receive a linear force (LF) from the motion conversion member 190. As a result, the slider 150 can perform a linear motion along a first direction D1. For example, the slider 150 can linearly move along the longitudinal direction of the slider 150 by the motion conversion member 190.

The shift lever 170 can rotate to a position according to a shift level by user operations. According to the embodiment, the shift lever 170 may include a lever body and a knob. The lever body may be formed in a predetermined longitudinal direction, and the knob may be disposed at one end of the lever body. Here, the knob may receive a user operation (INPUT) from the user.

The lever body may have a rotation center of the shift lever 170 inside or outside the lever body. That is, the shift lever 170 can rotate about the rotation center. For example, the shift lever 170 can rotate in space about one internal point as the rotation center. Accordingly, the knob disposed at one end of the lever body can move along the surface of the sphere centered on the rotation center. In one embodiment, the rotation center may be disposed at the other end of the lever body. In another embodiment, the rotation center may be disposed in the middle of the lever body. For example, the rotation center may be disposed at a position spaced apart from the knob by a predetermined distance in the longitudinal direction.

The rotation of the shift lever 170 may be restricted. That is, the surface of the sphere on which the knob can move may be limited to a portion of the entire surface of the sphere. For example, the knob may move only along a preset surface that includes a predetermined position corresponding to the shift level of the surface of the sphere. Here, the direction in which the knob moves may be a longitudinal direction (shift direction) or a transverse direction (select direction).

The knob can pass a third position corresponding to a neutral level while moving from a first position corresponding to a first shift level to a second position corresponding to a second shift level. For example, the user can move the knob located on the first position corresponding to the first shift level by a predetermined distance in the shift direction, by a predetermined distance in the select direction, and again by a predetermined distance in the shift direction. As a result, the knob can be located on the second position corresponding to the second shift level. In addition, the knob can pass the third position while moving in the select direction.

According to the embodiment, the shift lever 170 may include a lever ball. Here, the lever ball may have a spherical shape centered on the rotation center of the shift lever 170. Here, the motion conversion member 190 may be disposed to protrude from the lever ball. For example, when the motion conversion member 190 includes a structure that converts the rotational motion into the linear motion on the basis of a cam mechanism, the cam may be disposed to protrude from the lever ball. Here, the cam may be a protrusion member which not only includes one rotational axis therein about which the shift lever 170 rotates but also is formed with respect to the one rotational axis as a longitudinal direction.

The motion conversion member 190 can convert the rotational motion of the shift lever 170 into the linear motion. As a result, the motion conversion member 190 is able to move the slider 150 in the first direction D1. For example, the motion conversion member 190 can generate the linear force (LF) which moves the slider 150 on the basis of the rotational force (RF) generated by the rotation of the shift lever 170.

When the shift lever 170 rotates about one rotational axis passing through the rotation center, the motion conversion member 190 can convert the rotational motion into the linear motion. For example, when the shift lever 170 rotates about a shift rotational axis which is the rotational axis about which the knob is moved in the shift direction, the motion converting member 190 can convert the rotational motion into the linear motion.

However, the motion conversion member 190 may selectively convert the rotational motion of the shift lever 170 into the linear motion of the slider 150. That is, when the shift lever 170 rotates about another rotational axis passing through the rotation center, the motion conversion member 190 may not convert the rotational motion into the linear motion. For example, when the shift lever 170 rotates about a select rotational axis which is the rotational axis about which the knob is moved in the select direction, the motion conversion member 190 may not convert the rotational motion into the linear motion.

In the embodiment, the motion conversion member 190 can convert the rotational motion into the linear motion on the basis of at least one of Scotch Yoke mechanism, Whitworth Quick Return mechanism, or Slider Crank mechanism.

In another embodiment, the motion conversion member 190 can convert the rotational motion into the linear motion on the basis of a cam mechanism. For example, the motion conversion member 190 may include a cam and an elastic member. According to the embodiment, the cam may be one of a heart cam, a groove cam, a conical cam, or a swash plate cam.

The cam may be disposed in the shift lever 170 and may contact the other end of the slider 150. As a result, when the shift lever 170 rotates from the non-neutral position to the neutral position, the cam can move the slider 150 by a predetermined distance in the first direction D1. When the shift lever 170 rotates about one axis, the cam can rotate about the one axis together with the shift lever 170. For example, the cam may rotate, together with the shift lever 170, about one axis passing through the inside of the cam.

At the neutral position where the power of the engine is not transmitted to wheels, the cam can contact the other end of the slider 150. For example, when the shift level is the neutral state, the cam can move the slider 150 by a predetermined distance from the initial position in the longitudinal direction of the slider 150. When the cam is the heart cam, the one rotational axis of the shift lever 170 may be substantially the same as the rotational axis of the heart cam. The heart cam may have a shape pushing the other end of the slider 150 farthest from the rotational axis at the neutral position.

According to the embodiment, the cam may be disposed to protrude from the lever ball centered on the rotation center of the shift lever 170. For example, the cam may be disposed to protrude along the one rotational axis of the shift lever 170. Here, the cam can rotate about the one rotational axis. When the cam is the heart cam, the plane of the heart cam, which has a heart shape, and the one rotational axis may be substantially orthogonal to each other.

When the shift lever 170 rotates from the neutral position to the non-neutral position, the elastic member can move the slider 150 by a predetermined distance in a second direction D2. Here, the second direction D2 may be substantially opposite to the first direction D1. That is, the elastic member can return the slider 150 to the initial position when the shift level is at the non-neutral position.

To this end, one end of the elastic member may be connected to the housing in which the magnetic sensor 130 is disposed, and the other end of the elastic member may be connected to the slider 150. In this case, the distance between the slider 150 and the housing can be controlled based on the elastic force of the elastic member. As a result, at the neutral position, the slider 150 may be relatively closer to the magnetic sensor 130 than the initial position by the cam. However, at the non-neutral position, the slider 150 is returned to the initial position by the elastic member.

The elastic member may include a member having an elastic force. For example, the elastic member may be a spring having a predetermined modulus of elasticity. Here, one end of the spring may be connected to the housing, and the other end of the spring may be connected to the slider 150.

The housing may be fixed at a predetermined position. As a result, the magnetic sensor 130 disposed in the housing may be fixed at the predetermined position. According to the embodiment, the housing may be connected to one end of the elastic member. For example, one end of the spring may be connected to the housing, and the other end of the spring may be connected to the slider 150. As a result, the distance between the magnet 110 disposed at one end of the slider 150 and the magnetic sensor 130 disposed in the housing can be controlled.

The transmission control device 100 according to the embodiments of the present invention has a structure in which the rotational motion of the shift lever 170 is converted into the linear motion of the slider 150 in which the magnet 110 is disposed. Therefore, the magnetic sensor 130 is able to relatively easily detect the change of the shift level.

Figure 2:
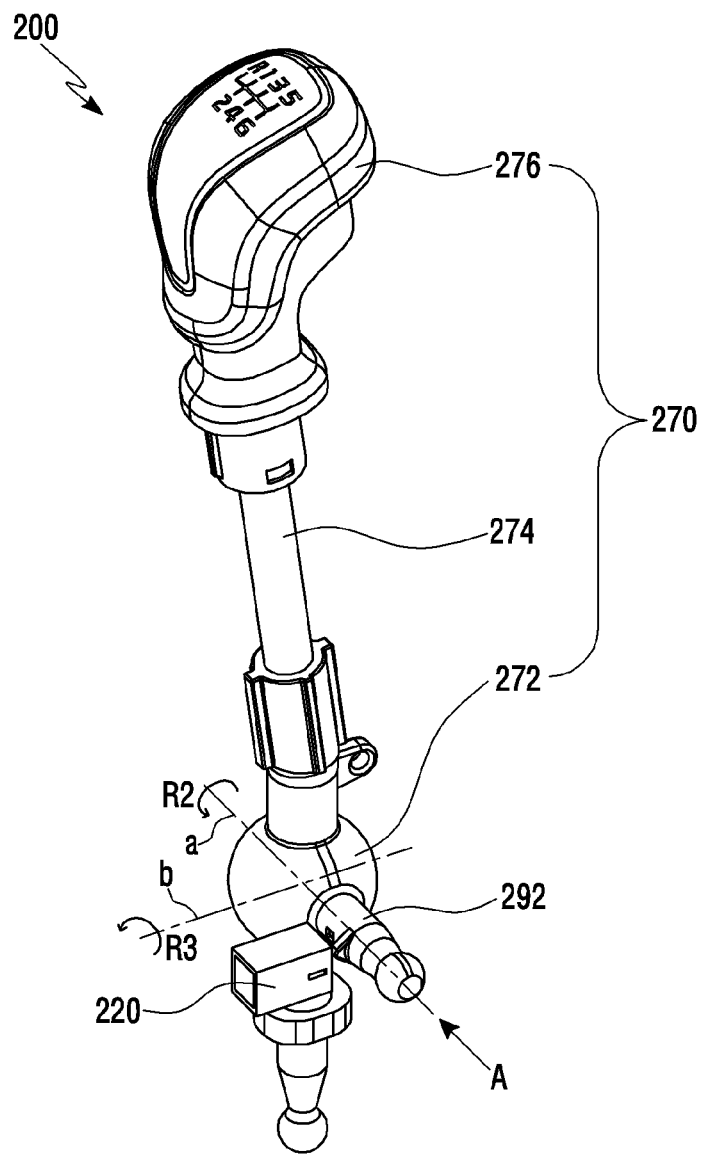
FIG. 2 is a perspective view showing an example of the transmission control device of FIG. 1.
Figure 3:
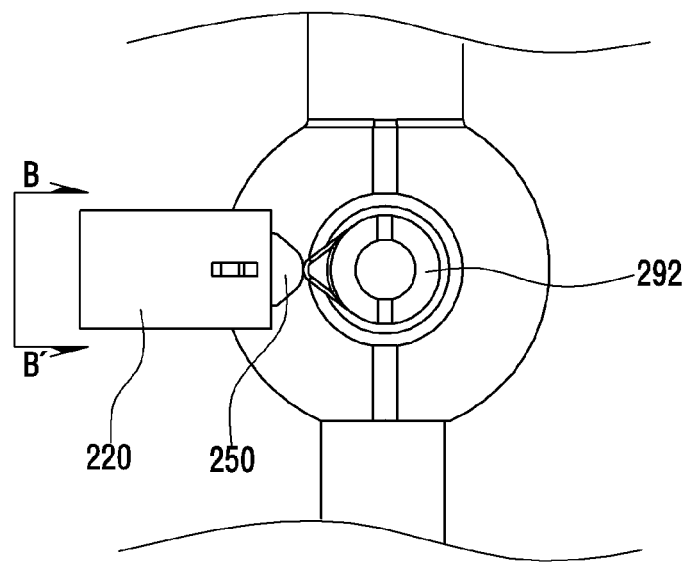
FIG. 3 is a view showing the transmission control device of FIG. 2, as viewed in the direction of "A"
Figure 4:
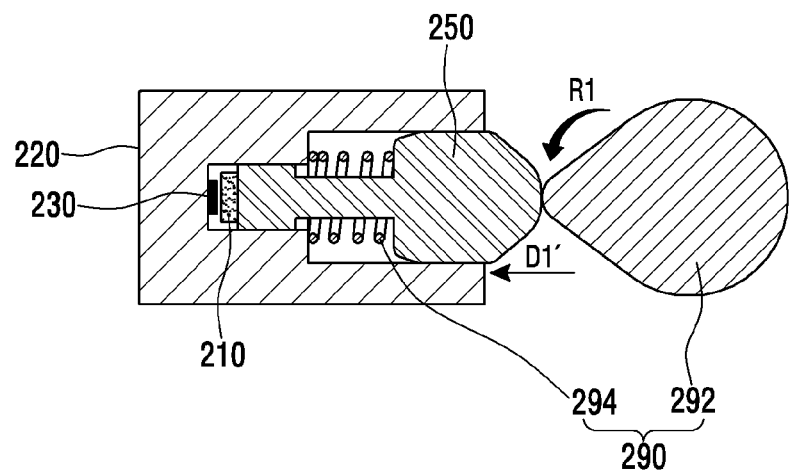
FIG. 4 is a cross sectional view showing the transmission control device of FIG. 3 taken along line B-B' at the neutral position.
Figure 5:
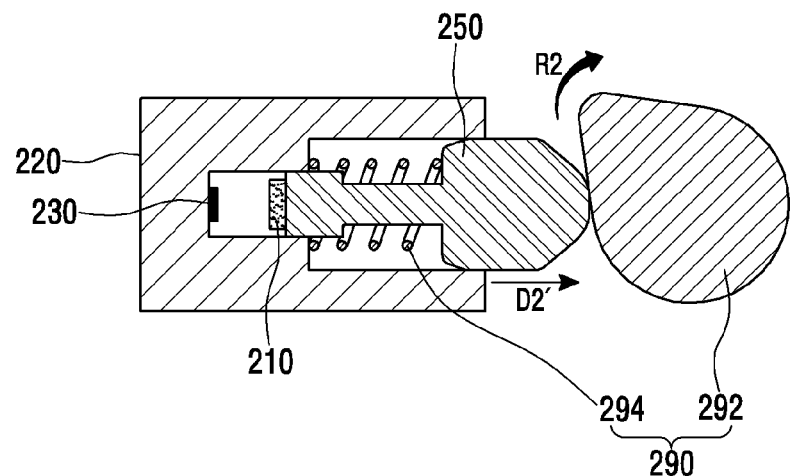
FIG. 5 is a cross sectional view showing the transmission control device of FIG. 3 taken along line B-B' at the neutral position.

FIG. 2 is a perspective view showing an example of the transmission control device of FIG. 1. FIG. 3 is a view showing the transmission control device of FIG. 2, as viewed in the direction of "A". FIG. 4 is a cross sectional view showing the transmission control device of FIG. 3 taken along line B-B' at the neutral position. FIG. 5 is a cross sectional view showing the transmission control device of FIG. 3 taken along line B-B' at the non-neutral position.

Referring to FIGS. 2 to 5, a transmission control device 200 may include a magnet 210, a magnet sensor 230, a slider 250, a shift lever 270, a motion conversion member 290, and a housing 220.

The magnet 210 can generate a magnetic field. In the embodiment, the magnet 210 may be a permanent magnet. In another embodiment, the magnet 210 may be an electromagnet. In this case, the strength of the magnetic field generated by the magnet 210 can be controlled by the magnitude of the current which is supplied to the magnet 210.

The magnetic sensor 230 may be fixed to a predetermined position and measure the magnetic field which changes according to a relative position with respect to the magnet 210. Since the magnetic field that is generated around the magnet 210 is reduced with the increase of a distance from the magnet 210, a value of measured strength of the magnetic field may be substantially changed according to a position where the magnetic sensor 230 measures the magnetic field (MG) even though the magnet 210 generates substantially the same magnetic field. For example, a first measured value measured by the magnetic sensor 230 which measures the strength of the magnetic field at a position apart from the magnet 210 by a first distance may be relatively greater than a second measured value measured by the magnetic sensor 230 which measures the strength of the magnetic field at a position apart from the magnet 210 by a second distance relatively greater than the first distance. Through this, the distance between the magnet 210 and the magnetic sensor 230 can be estimated on the basis of the strength of the magnetic field measured by the magnetic sensor 230.

According to the embodiment, the magnetic sensor 230 may be a Hall integrated circuit (Hall IC). Here, the Hall integrated circuit can measure the strength of the magnetic field (MG) on the basis of a Hall effect.

The magnet 210 may be disposed at one end of the slider 250. The magnet 210 may be disposed on the surface of the one end of the slider 250.

The slider 250 can receive a linear force from the motion conversion member 290. As a result, the slider 250 can perform a linear motion along a first direction D1'. For example, the slider 250 can linearly move along the longitudinal direction of the slider 250 by a cam 292.

The shift lever 270 can rotate to a position according to the shift level by user operations. According to the embodiment, the shift lever 270 may include a lever body 274 and a knob 276. The lever body 274 may be formed in a predetermined longitudinal direction, and the knob 276 may be disposed at one end of the lever body 274. Here, the knob 276 may receive a user operation from the user.

The lever body 274 may have the rotation center of the shift lever 270 inside or outside the lever body 274. That is, the shift lever 270 can rotate about the rotation center. For example, the shift lever 270 can rotate in space about one internal point as the rotation center. Accordingly, the knob 276 disposed at one end of the lever body 274 can move along the surface of the sphere centered on the rotation center. The rotation center may be disposed in the middle of the lever body 274. For example, the rotation center may be disposed at a position spaced apart from the knob 276 by a predetermined distance in the longitudinal direction.

The rotation of the shift lever 270 may be restricted. That is, the surface of the sphere on which the knob 276 can move may be limited to a portion of the entire surface of the sphere. For example, the knob 276 may move only along a preset surface that includes a predetermined position corresponding to the shift level of the surface of the sphere. Here, the direction in which the knob 276 moves may be a longitudinal direction (shift direction) or a transverse direction (select direction). Here, when the knob 276 moves in the shift direction, the shift lever 270 may rotate about a first rotational axis "a", and when the knob 276 moves in the select direction, the shift lever 270 may rotate about a second rotational axis "b".

The knob 276 can pass a third position corresponding to a neutral level while moving from a first position corresponding to a first shift level to a second position corresponding to a second shift level. For example, the user can move the knob 276 located on the first position corresponding to the first shift level by a predetermined distance in the shift direction, by a predetermined distance in the select direction, and again by a predetermined distance in the shift direction. As a result, the knob 276 can be located on the second position corresponding to the second shift level. In addition, the knob 276 can pass the third position while moving in the select direction.

According to the embodiment, the shift lever 270 may include a lever ball 272. Here, the lever ball 272 may have a spherical shape centered on the rotation center of the shift lever 270. Here, the cam 292 may be disposed to protrude from the lever ball 272. Here, the cam 292 may be a protrusion member which not only includes one rotational axis therein about which the shift lever 270 rotates but also is formed with respect to the one rotational axis as a longitudinal direction.

The motion conversion member 290 can convert the rotational motion of the shift lever 270 into the linear motion. As a result, the motion conversion member 290 is able to move the slider 250 in the first direction D1'. For example, when the shift lever 270 rotates in a first rotation direction R1 (that is to say, the neutral position), the cam 292 can move the slider 250 in the first direction D1'. Meanwhile, when the shift lever 270 rotates in a second rotation direction R2 (that is to say, the non-neutral position), an elastic member 294 can move the slider 250 in a second direction D2'.

When the shift lever 270 rotates about one rotational axis passing through the rotation center, the motion conversion member 290 can convert the rotational motion into the linear motion. For example, when the shift lever 270 rotates about a shift rotational axis which is the rotational axis about which the knob 276 is moved in the shift direction, the motion converting member 290 can convert the rotational motion into the linear motion.

However, the motion conversion member 290 may selectively convert the rotational motion of the shift lever 270 into the linear motion of the slider 250. That is, when the shift lever 270 rotates about another rotational axis passing through the rotation center, the motion conversion member 290 may not convert the rotational motion into the linear motion. For example, when the shift lever 270 rotates about a select rotational axis which is the rotational axis about which the knob 276 is moved in the select direction, the motion conversion member 290 may not convert the rotational motion into the linear motion.

The motion conversion member 290 can convert the rotational motion into the linear motion on the basis of the cam mechanism. For example, the motion conversion member 290 may include the cam 292 and the elastic member 294.

The cam 292 may be disposed in the shift lever 270 and may contact the other end of the slider 250. As a result, when the shift lever 270 rotates from the non-neutral position to the neutral position (that is to say, rotates in the first rotation direction R1), the cam 292 can move the slider 250 by a predetermined distance in the first direction D1'. When the shift lever 270 rotates about one axis, the cam 292 can rotate about the one axis together with the shift lever 270. For example, the cam 292 may rotate, together with the shift lever 270, about one axis passing through the inside of the cam 292.

At the neutral position where the power of the engine is not transmitted to wheels, the cam 292 can contact the other end of the slider 250. For example, when the shift level is the neutral state, the cam 292 can move the slider 250 by a predetermined distance from the initial position in the longitudinal direction of the slider 250. The one rotational axis of the shift lever 270 may be substantially the same as the rotational axis of the cam 292. The cam 292 may have a shape pushing the other end of the slider 250 farthest from the rotational axis at the neutral position.

According to the embodiment, the cam 292 may be disposed to protrude from the lever ball 272 centered on the rotation center of the shift lever 270. For example, the cam 292 may be disposed to protrude along the one rotational axis of the shift lever 270. Here, the cam 292 can rotate about the one rotational axis. The plane of the cam 292 and the one rotational axis may be substantially orthogonal to each other.

When the shift lever 270 rotates from the neutral position to the non-neutral position (that is to say, rotates in the second rotation direction R2), the elastic member 294 can move the slider 250 by a predetermined distance in the second direction D2'. Here, the second direction D2' may be substantially opposite to the first direction D1'. That is, the elastic member 294 can return the slider 250 to the initial position when the shift level is at the non-neutral position.

To this end, one end of the elastic member 294 may be connected to the housing 220 in which the magnetic sensor 230 is disposed, and the other end of the elastic member 294 may be connected to the slider 250. In this case, the distance between the slider 250 and the housing 220 can be controlled based on the elastic force of the elastic member 294. As a result, at the neutral position, the slider 250 may be relatively closer to the magnetic sensor 230 than the initial position by the cam 292. However, at the non-neutral position, the slider 250 is returned to the initial position by the elastic member 294.

The elastic member 294 may include a member having an elastic force. For example, the elastic member 294 may be a spring having a predetermined modulus of elasticity. Here, one end of the spring may be connected to the housing 220, and the other end of the spring may be connected to the slider 250.

The housing 220 may be fixed at a predetermined position. As a result, the magnetic sensor 230 disposed in the housing 220 may be fixed at the predetermined position. The housing 220 may be connected to one end of the elastic member 294. As a result, the distance between the magnet 210 disposed at one end of the slider 250 and the magnetic sensor 230 disposed in the housing 220 can be controlled.

Figure 6:
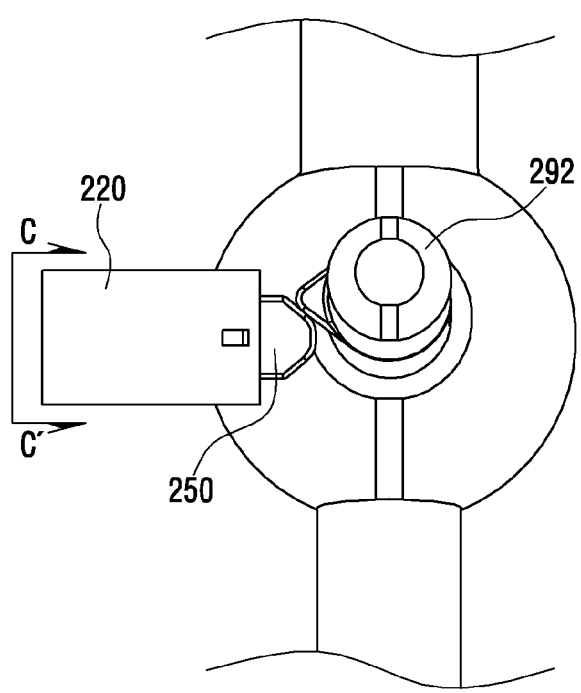
FIG. 6 is a perspective view showing that a shift lever included in the transmission control device of FIG. 2 has been rotated in a select direction.
Figure 7:
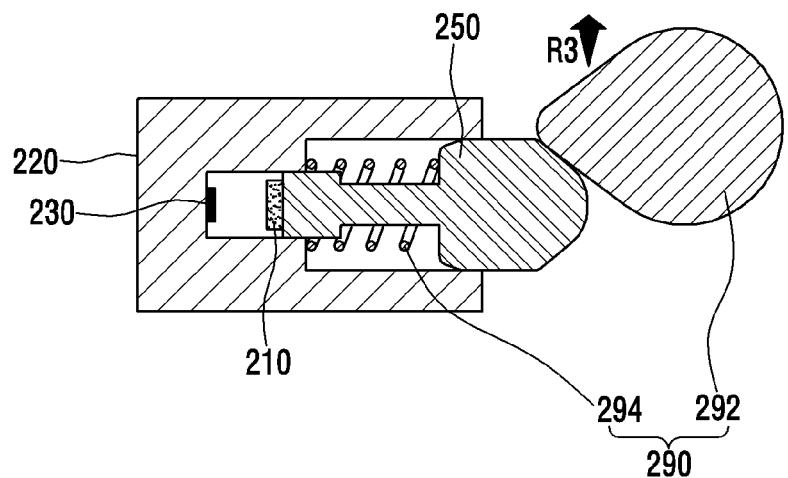
FIG. 7 is a cross sectional view showing the transmission control device of FIG. 6 taken along line C-C'.

FIG. 6 is a perspective view showing that the shift lever included in the transmission control device of FIG. 2 has been rotated in the select direction. FIG. 7 is a cross sectional view showing the transmission control device of FIG. 6 taken along line C-C'.

Referring to FIGS. 6 and 7, the shift lever 270 can rotate in a select direction R3. As the shift lever 270 rotates in the select direction R3, the cam 292 can rotate as well. However, since the slider 250 is substantially not influenced by the rotation of the shift lever 270, the cam 292 and the slider 250 may deviate from each other in a three-dimensional manner. In other words, as the shift lever 270 rotates in the select direction R3, the influence of the cam 292, which is caused by the engagement between the cam 292 and the slider 250, may be reduced as shown in FIG. 7. According to the embodiment, the shift lever 270 can rotate in the select direction enough such that the cam 292 is not engaged with the slider 250 at all.

As a result, the slider 250 and the magnet 210 disposed on the slider 250 can be sufficiently far away from the magnetic sensor 230 by the elastic member 294, and it can be detected based on the magnetic field measured by the magnetic sensor 230 that the shift level is at the non-neutral position.

Figure 8:
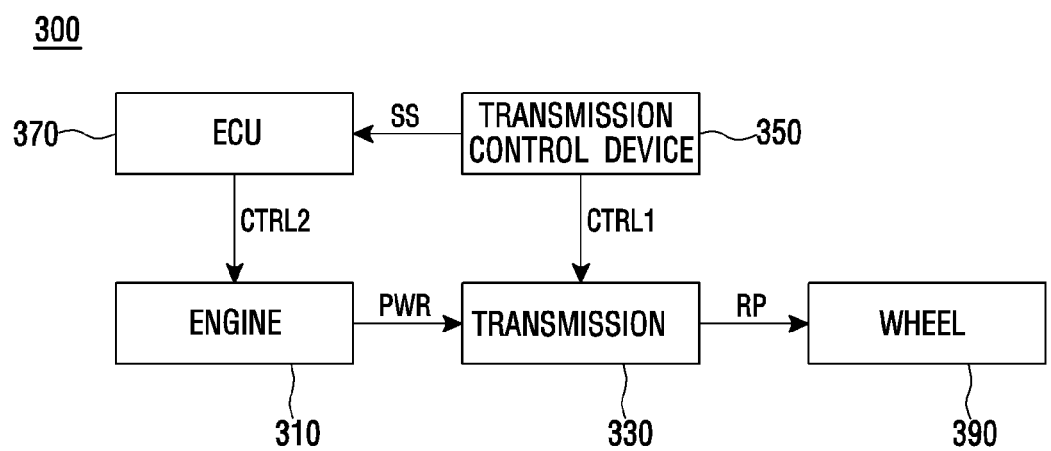
FIG. 8 is a block diagram showing a vehicle according to the embodiments of the present invention.

FIG. 8 is a block diagram showing a vehicle according to the embodiments of the present invention.

Referring to FIG. 8, a vehicle 300 may include the engine 310, the transmission 330, and the transmission control device 350. According to the embodiment, the vehicle 300 may further include an electronic control unit 370 and/or wheels 390.

The engine 310 can generate power (PWR). The generated power (PWR) is transmitted to the transmission 330. The transmission 330 can convert the power (PWR) into rotatory power (RP). For this, the transmission 330 can use different gears according to the shift level. The generated rotatory power (RP) can be transmitted to the wheels 390.

The transmission control device 350 can control the transmission 330 by controlling the shift level. For example, the transmission control device 350 can control the transmission 330 by means of a first control method (CTRL 1) that performs mechanical and/or electrical control.

The transmission control device 350 may include the magnet, the magnetic sensor, the slider, the shift lever, and the motion conversion member. The magnetic sensor may be fixed to a predetermined position and measure the magnetic field which changes according to a relative position with respect to the magnet. The magnet may be disposed at one end of the slider. The shift lever can rotate to a position according to the shift level by user operations. When the shift lever rotates, the motion conversion member can move the slider in the first direction. To this end, the motion conversion member can convert the rotational motion of the shift lever into the linear motion.

The electronic control unit 370 can drive Idle Stop & Go (ISG) function on the basis of the measured magnet field SS. To this end, the electronic control unit 370 can control the starting of the engine by means of a second control method (CTRL 2) which mechanically and/or electrically controls the engine 310. For example, the electronic control unit 370 can drive the Idle Stop & Go (ISG) function on the basis of the measured magnetic field SS at the neutral position where the power (PWR) of the engine 310 is not finally transmitted to the wheels 390. That is, the electronic control device 370 can turn off the engine 310 at the neutral position.

The wheel 390 can move the vehicle 300 forward or backward by a friction force with the ground in accordance with the rotatory power RP.

In the vehicle 300 according to the embodiment of the present invention, the transmission control device 350 detects the neutral position, thereby implementing the Idle Stop & Go (ISG) function at the neutral position.

While the transmission control device and the vehicle including the same according to the embodiments of the present invention has been described, the foregoing embodiments are merely exemplary and may be changed or modified without departing from the technical spirit of the present invention by a person having ordinary skill in the art to which the present invention pertains to.

INDUSTRIAL APPLICABILITY

The embodiment of the present invention can be variously applied to a vehicle equipped with a manual transmission control device. For example, the embodiment of the present invention can be applied to a car, a van, a truck, a bus, and construction machinery, etc., which are equipped with the manual transmission control device.

While the present invention has been described with reference to the embodiments thereof, it will be understood by those skilled in the art that various changes and modification in forms and details may be made without departing from the spirit and scope of the present invention as defined by the appended claims.

What is claimed is:

1. A transmission control device comprising:
a magnet;
a magnetic sensor which is fixed to a predetermined position and measures a magnetic field which changes according to a relative position with respect to the magnet;
a slider one end of which has the magnet thereat, the slider configured to move linearly;
a shift lever which rotates to a position according to a shift level by user operations;
a motion conversion member which, when the shift lever rotates, converts the rotational motion of the shift lever into a linear motion of the slider, and moves the slider in a first direction, the motion conversion member including:
a cam which protrudes from the shift lever contacts another end of the slider, and a distance between the magnet and the magnetic sensor is narrowed by moving the slider by a predetermined distance in the first direction when the shift lever rotates from a non-neutral position to a neutral position; and
an elastic member which is disposed in an outer side of the slider such that the elastic member is compressed or stretched in a same direction as the slider, and the distance between the magnet and the magnetic sensor is widened by moving the slider by the predetermined distance in a second direction opposite to the first direction when the shift lever rotates from the neutral position to the non-neutral position.

2. The transmission control device of claim 1,
wherein the shift lever comprises a lever ball having a spherical shape centered on a rotation center of the shift lever,
wherein the cam is disposed to protrude from the lever ball.

3. The transmission control device of claim 1, further comprising a housing in which the magnetic sensor is disposed,
wherein one end of the elastic member is connected to the housing, and the other end is connected to the slider.

4. The transmission control device of claim 1, wherein the magnetic sensor is a Hall integrated circuit (IC).

5. A vehicle comprising:
an engine which generates power;
a transmission that converts the power into a rotatory power; and
a transmission control device which controls a shift level of the transmission, wherein the transmission control device comprises:
a magnet;
a magnetic sensor which is fixed to a predetermined position and measures a magnetic field which changes according to a relative position with respect to the magnet;
a slider one end of which has the magnet thereat, the slider configured to move linearly;
a shift lever which rotates to a position according to the shift level by user operations;
a motion conversion member which, when the shift lever rotates, converts the rotational motion of the shift lever into a linear motion of the slider, and moves the slider in a first direction, the motion conversion member comprising:
a cam which is partially disposed in the shift lever contacts another end of the slider, and the distance between the magnet and the magnetic sensor is narrowed by moving the slider by a predetermined distance in the first direction when the shift lever rotates from a non-neutral position to a neutral position; and
an elastic member which is disposed in an outer side of the slider such that the elastic member is compressed or stretched in a same direction as the slider, and the distance between the magnet and the magnetic sensor is widened by moving the slider by the predetermined distance in a second direction opposite to the first direction when the shift lever rotates from the neutral position to the non-neutral position.

* * * * *